United States Patent
Sun et al.

(10) Patent No.: US 11,822,528 B2
(45) Date of Patent: Nov. 21, 2023

(54) DATABASE SELF-DIAGNOSIS AND SELF-HEALING

(71) Applicant: International Business Machines Corporation, Armonk, NY (US)

(72) Inventors: Sheng Yan Sun, Beijing (CN); Min Li, Beijing (CN); Shuo Li, Beijing (CN); Xiaobo Wang, Beijing (CN); Jian Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/031,996

(22) Filed: Sep. 25, 2020

(65) Prior Publication Data

US 2022/0100722 A1     Mar. 31, 2022

(51) Int. Cl.
*G06F 16/21* (2019.01)
*G06F 16/28* (2019.01)

(52) U.S. Cl.
CPC .......... *G06F 16/217* (2019.01); *G06F 16/285* (2019.01)

(58) Field of Classification Search
CPC .............................. G06F 16/217; G06F 16/285
See application file for complete search history.

(56) References Cited

U.S. PATENT DOCUMENTS

| | | | |
|---|---|---|---|
| 8,775,412 B2 | 7/2014 | Day et al. | |
| 11,030,207 B1* | 6/2021 | Setlur | G06F 16/248 |
| 2006/0173672 A1* | 8/2006 | Bergeron | G06F 40/20 704/9 |
| 2008/0027893 A1* | 1/2008 | Cavestro | G06F 16/313 707/E17.084 |
| 2008/0091408 A1* | 4/2008 | Roulland | G06F 16/3338 707/E17.074 |
| 2012/0123992 A1* | 5/2012 | Randall | G06F 16/48 706/50 |
| 2013/0290338 A1* | 10/2013 | Lee | G06F 16/285 707/739 |
| 2014/0149446 A1* | 5/2014 | Kuchmann-Beauger | G06F 16/248 707/763 |

(Continued)

OTHER PUBLICATIONS

"Automate Trouble Ticketing Management with Natural Language Processing", Automate Trouble Ticketing Management with Natural Language Processing—Capgemini Worldwide, Apr. 14, 2020, 8 pages, <https://www.capgemini.com/2016/12/automate-trouble-ticketing-management-with-natural-language-processing/#>.

(Continued)

*Primary Examiner* — Grace Park
(74) *Attorney, Agent, or Firm* — Edward J. Wixted, III

(57) ABSTRACT

In an approach for database self-diagnosis and self-healing, a processor receives a problem description related to a database. A processor classifies the problem description into a natural language description portion and a database-know-who content portion. A processor processes the natural language description portion using natural language processing techniques. A processor evaluates the database-know-who content portion. A processor combines a result of processing the natural language description portion and evaluating the database-know-who content portion. A processor identifies a solution based on the problem description and the combined result. A processor solves a problem using the identified solution.

9 Claims, 16 Drawing Sheets

(56) References Cited

U.S. PATENT DOCUMENTS

| | | | | |
|---|---|---|---|---|
| 2015/0032751 | A1* | 1/2015 | Ting | G06F 16/285 |
| | | | | 707/738 |
| 2016/0092557 | A1* | 3/2016 | Stojanovic | G06F 16/254 |
| | | | | 707/723 |
| 2016/0314035 | A1* | 10/2016 | Chen | G06F 16/2455 |
| 2017/0091312 | A1* | 3/2017 | Ajmera | G06F 16/3329 |
| 2018/0082183 | A1* | 3/2018 | Hertz | G06F 16/288 |
| 2018/0137152 | A1* | 5/2018 | Reichert | G06F 16/217 |
| 2019/0095470 | A1* | 3/2019 | Dundjerski | G06F 16/245 |
| 2019/0243917 | A1* | 8/2019 | Ashoori | G06F 16/367 |
| 2019/0278777 | A1* | 9/2019 | Malik | G06F 16/211 |
| 2019/0347282 | A1* | 11/2019 | Cai | G06F 16/3329 |
| 2019/0361686 | A1* | 11/2019 | Gnazdowsky | G06F 16/9024 |
| 2020/0051559 | A1* | 2/2020 | Park | G06F 16/90332 |
| 2020/0151154 | A1* | 5/2020 | Kumar | G06F 16/248 |
| 2021/0216442 | A1* | 7/2021 | Bhadani | G06F 11/3684 |
| 2021/0248024 | A1* | 8/2021 | Poola | G06F 16/217 |
| 2021/0334245 | A1* | 10/2021 | Shah | G06F 16/221 |

OTHER PUBLICATIONS

C et al., "Self Diagnosis and Self-Healing Technology In Cloud Computing", Proceedings of the International Conferences People Connect: Networking For Sustainable Development, Nov. 2017, Bengaluru, India, ISSN: 2320-2882, 4 pages, <http://www.ijcrt.org/papers/IJCRTICPN043.pdf>.

Clouder, Alibaba, "Technical Analysis of the Alibaba Cloud Self-Diagnostic System", Technical Analysis of the Alibaba Cloud Self-Diagnostic System—Alibaba Cloud Community, Apr. 13, 2020, 7 pages, <https://www.alibabacloud.com/blog/technical-analysis-of-the-alibaba-cloud-self-diagnostic-system_594394>.

Zheng et al., "COTA: Improving Uber Customer Care with NLP & Machine Learning", COTA: Improving Uber Customer Care with NLP & Machine Learning, Apr. 14, 2020, 10 pages, <https://eng.uber.com/cota/>.

Mell et al., "The NIST Definition of Cloud Computing", Recommendations of the National Institute of Standards and Technology, Special Publication 800-145, Sep. 2011, 7 pages.

* cited by examiner

```
-- SQL described in patch illustration
SELECT Table_Parent.Column_1 + Table_Child.Column_1
       FROM Table_Parent,
            Table_Child
       WHERE Table_Parent.Column_1 = Table_Child.Column_1
         AND Table_Child.Column_2 IN ('ABC', 'DEF', 'OPQ')
```

702a — Table_Parent
704a — Table_Child

Normalize object names

```
-- After name normalization
SELECT Tab#1.COL_INT + Tab#2.COL_INT
       FROM Tab#1,
            Tab#2
       WHERE Tab#1.COL_INT = Tab#2.COL_INT
         AND Tab#2.COL_VARCHAR IN (?, ?, ?)
```

702b — Tab#1
704b — Tab#2

FIG. 7

SQL ILLUSTRATION - SQL SEMANTIC COMPARISON
PREDICATE TREE MATCHING
PREDICATE OF SQL RUNNING UNDER DATABASE
WHERE District.Num = TAB#1.COL_INT          P1
AND Tab#1.COL_INT = TAB#2.COL_INT           P2
AND ( District.Location = '3rdRing'         P3
   OR TAB#1.COL_VARCHAR LIKE ? )            P4
AND TAB#2.COL_VARCHAR IN (?, ?)             P5
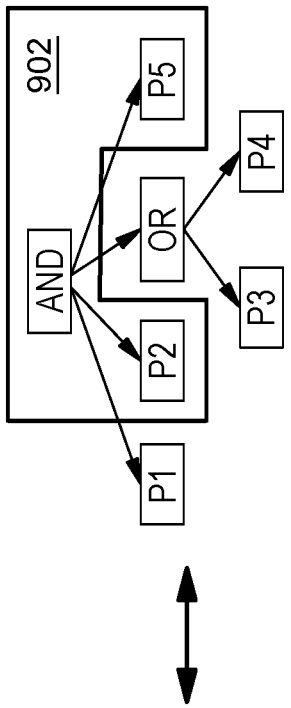
PREDICATE OF SQL FROM PATCH ILLUSTRATION
WHERE Tab#1.COL_INT = TAB#2.COL_INT          P2
AND TAB#2.COL_VARCHAR IN (?, ?, ?)           P5
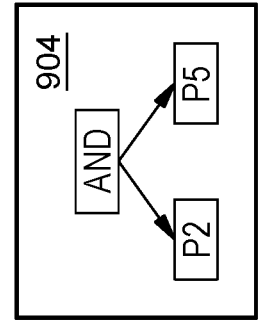
FIG. 9

SQL ILLUSTRATION - SQL ACCESS PATH COMPARISON
• EXPLAIN INFORMATION IN RELATED ILLUSTRATION
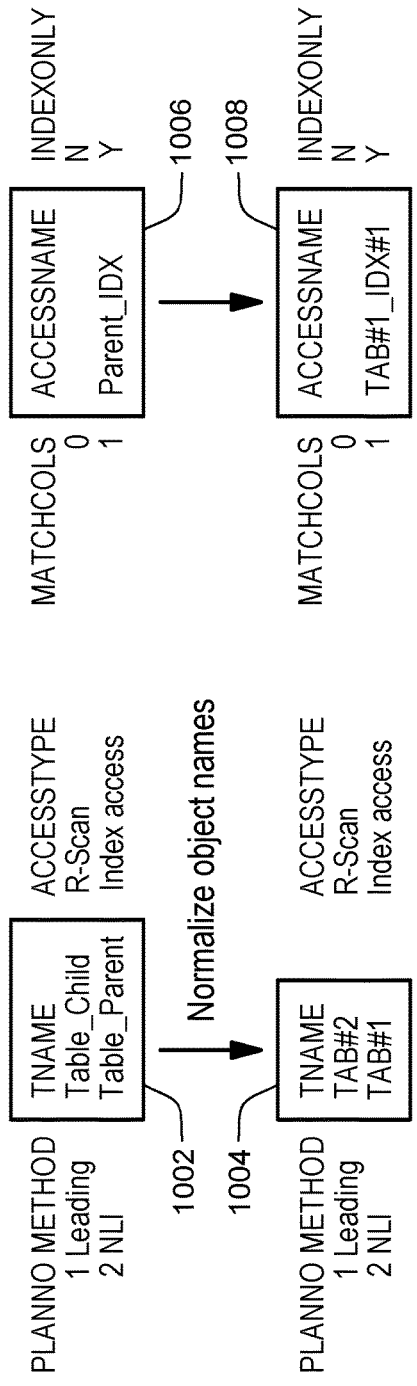
EXPLAIN INFORMATION AGAINST SQLs RUNNING UNDER DATABASE SYSTEM:
FIG. 10

SQL ILLUSTRATION - SQL ACCESS PATH COMPARISON
● SUBSET POSITIONING

| METHOD | TNAME | ACCESSTYPE | MATCHCOLS | ACCESSNAME | INDEXONLY | SORTN_UNIQ | SORTN_JOIN | QBLOCK_TYPE | TABLE_TYPE |
|---|---|---|---|---|---|---|---|---|---|
| Leading | TAB#2 | R-Scan | 0 | | N | N | N | SELECT | T |
| NLI | TAB#1 | Index access | 1 | TAB#1_IDX#1 | Y | N | Y | SELECT | T |
| NLI | District | R-Scan | 0 | | Y | N | Y | SELECT | T |

TABLE 2-1
↳ 1104

EXPLAIN INFORMATION AGAINST SQL DESCRIBED FROM PATCH ILLUSTRATION:

| METHOD | TNAME | ACCESSTYPE | MATCHCOLS | ACCESSNAME | INDEXONLY | SORTN_UNIQ | SORTN_JOIN | QBLOCK_TYPE | TABLE_TYPE |
|---|---|---|---|---|---|---|---|---|---|
| Leading | TAB#2 | R-Scan | 0 | | N | N | N | SELECT | T |
| NLI | TAB#1 | Index access | 1 | TAB#1_IDX#1 | Y | N | Y | SELECT | T |

↳ 1102

SUBSET RELATIONSHIP

FIG. 11

DATABASE SELF-DIAGNOSIS AND SELF-HEALING

BACKGROUND

The present disclosure relates generally to the field of database management, and more particularly to database self-diagnosis and self-healing.

A database is an organized collection of data, generally stored and accessed electronically from a computer system. Databases may be developed using formal design and modeling techniques. A database management system may be computer software that interacts with end users, applications, and the database itself to capture and analyze data. A self-healing system can be a system that will detect, diagnose, and repair performance problems and hardware/software faults automatically.

SUMMARY

Aspects of an embodiment of the present disclosure disclose an approach for database self-diagnosis and self-healing. A processor receives a problem description related to a database. A processor classifies the problem description into a natural language description portion and a database-know-who content portion. A processor processes the natural language description portion using natural language processing techniques. A processor evaluates the database-know-who content portion. A processor combines a result of processing the natural language description portion and evaluating the database-know-who content portion. A processor identifies a solution based on the problem description and the combined result. A processor solves a problem using the identified solution.

BRIEF DESCRIPTION OF THE DRAWINGS

FIG. 7 is an example illustrating a name normalization of the database content evaluation module in the database self-diagnosis and self-healing module within the computing device of FIG. 1, in accordance with one or more embodiments of the present disclosure.

FIG. 9 is an example illustrating a predicate tree matching of the database content evaluation module in the database self-diagnosis and self-healing module within the computing device of FIG. 1, in accordance with one or more embodiments of the present disclosure.

FIG. 10 is example illustrating an access path comparison of the database content evaluation module in the database self-diagnosis and self-healing module within the computing device of FIG. 1, in accordance with one or more embodiments of the present disclosure.

FIG. 11 is example illustrating an access path comparison of the database content evaluation module in the database self-diagnosis and self-healing module within the computing device of FIG. 1, in accordance with one or more embodiments of the present disclosure.

DETAILED DESCRIPTION

The present disclosure is directed to systems and methods for database self-diagnosis and self-healing.

Embodiments of the present disclosure recognize a need for self-diagnosis and self-healing methods and systems to automatically diagnose errors and abnormalities in a database caused by an operation, e.g., a mis-operation, and to repair the errors and abnormalities automatically, e.g., in a real-time. Embodiments of the present disclosure may reduce feedback and communication costs, shorten troubleshooting time, and improve troubleshooting efficiency for a problem. Embodiments of the present disclosure disclose continuous improvements in terms of timeliness and accuracy in diagnosing and repairing errors and abnormalities from a database. For example, embodiments of the present disclosure may include easy and fast problem feedback, accurate and complete feedback information, facilitating troubleshooting, ensuring timeliness with second-level automatic responses, accurate and immediate delivery of problem information to appropriate personnel, a short troubleshooting period, a closed-loop troubleshooting process, and good user experience.

Figure 1:
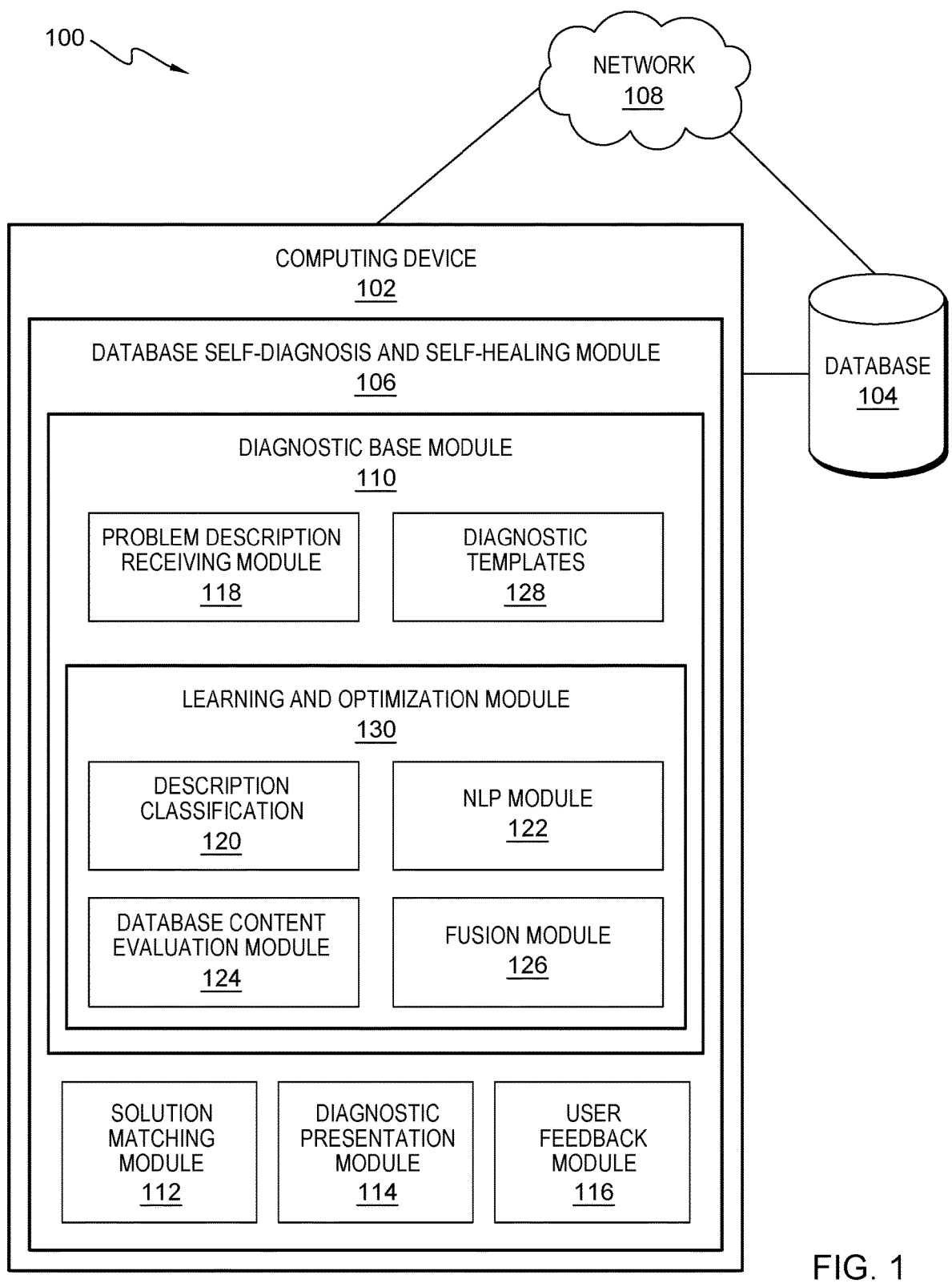
FIG. 1 is a functional block diagram illustrating a database self-diagnosis and self-healing environment, in accordance with an embodiment of the present disclosure.

The present disclosure will now be described in detail with reference to the Figures. FIG. 1 is a functional block diagram illustrating a database self-diagnosis and self-healing environment, generally designated 100, in accordance with an embodiment of the present disclosure.

In the depicted embodiment, database self-diagnosis and self-healing environment 100 includes computing device 102, database 104 and network 108. In an example, database 104 may be a local database that is directly connected to computer device 102. In another example, database 104 can be a cloud database that may be communicated with computer device 102 through network 108.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to database self-diagnosis and self-healing module 106, database 104 and network 108 and is capable of processing program instructions and executing database self-diagnosis and self-healing module 106, in accordance with an embodiment of the present disclosure. Computing device 102 may include internal and external hardware components, as depicted and described in further detail with respect to FIG. 14.

Further, in the depicted embodiment, computing device 102 includes database self-diagnosis and self-healing module 106. In the depicted embodiment, database self-diagnosis and self-healing module 106 is located on computing device 102. However, in other embodiments, database self-diagnosis and self-healing module 106 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and database self-diagnosis and self-healing module 106, in accordance with a desired embodiment of the disclosure.

In the depicted embodiment, database self-diagnosis and self-healing module 106 includes diagnostic base module 110, solution matching module 112, diagnostic presentation module 114, and user feedback module 116. In the depicted embodiment, diagnostic base module 110, solution matching module 112, diagnostic presentation module 114, and user feedback module 116 are located on computing device 102. However, in other embodiments, diagnostic base module 110, solution matching module 112, diagnostic presentation module 114, and user feedback module 116 may be located externally and accessed through a communication network such as network 108.

In the depicted embodiment, diagnostic base module 110 includes problem description receiving module 118, diagnostic templates 128, and learning and optimization module 130. In the depicted embodiment, problem description receiving module 118, diagnostic templates 128, and learning and optimization module 130 are located on computing device 102. However, in other embodiments, problem description receiving module 118, diagnostic templates 128, and learning and optimization module 130 may be located externally and accessed through a communication network such as network 108.

In one or more embodiments, problem description receiving module 118 is configured to receive problem description for abnormal situations from database 104. For example, the abnormal situations may include problems generated by tickets, error related problems, operation related problems, conversational related problems, and other problems reported from database 104. The problem description can be generated as a ticket, e.g., a service request or a problem management record, by a user.

In one or more embodiments, diagnostic templates 128 may include causes and troubleshooting methods for exceptions of different resources and operation types in database 104. One or more diagnostic templates 128 can be or be combined to produce a diagnostic solution in solution matching module 112. Learning and optimization module 130 may continuously optimize diagnostic templates 128 using adaptation and other learning and optimization algorithms.

In the depicted embodiment, learning and optimization module 130 includes description classification 120, natural language processing (NLP) module 122, database content evaluation module 124, and fusion module 126. In the depicted embodiment, description classification 120, NLP module 122, database content evaluation module 124, and fusion module 126 are located on computing device 102. However, in other embodiments, description classification 120, NLP module 122, database content evaluation module 124, and fusion module 126 may be located externally and accessed through a communication network such as network 108.

In one or more embodiments, description classification 120 is configured to split a problem description into a natural language description portion and a non-natural language description portion. Description classification 120 may get corresponding database structures and level a Backus normal form (BNF) tree to split problem description into a natural language processing part and a database-know-who part. In general, BNF is a notation technique for context-free grammars, often used to describe the syntax of languages used in computing, such as computer programming languages, document formats, instruction sets and communication protocols. BNF may be applied wherever exact descriptions of languages are needed: for instance, in official language specifications, in manuals, and in textbooks on programming language theory. In an example, the problem description may include both natural language description portion and non-natural language description portion. In another example, the problem description may include only natural language description portion. In yet another example, the description data may include non-natural language description portion only. The non-natural language description portion can be a database content language. For example, the non-natural language description portion can be a structure content for a database language, e.g., structured query language (SQL). For example, SQL may allow a user to access and manipulate databases 104. The non-natural language description portion can include other suitable database languages. The natural language description portion may be as an input to NLP module 122. The non-natural language description portion may be as an input to database content evaluation module 124. In one or more embodiments, description classification 120 may include a database dictionary. The database dictionary can include natural language words. The database dictionary can also include database relative terms and contents. The database dictionary can be generated by incorporating, for example, a natural language toolkit (NLTK). NLTK can be a suite of libraries and programs for symbolic and statistical natural language processing in a programming language, e.g., Python programming language, or other programming languages. The database dictionary can be generated by incorporating database relative terms crawled from a database knowledge center.

In one or more embodiments, NLP module 122 is configured to process a natural language description portion classified from description classification 120. NLP module 122 may generate a vocabulary by processing texts in the natural language description portion. NLP module 122 may generate a term-document matrix based on the occurrence frequency of each term (e.g., word) in each document. In an example, the term-document matrix may be divided into a form of multiple matrices. NLP module 122 may use a latent semantic analysis technique in natural language processing, in particular distributional semantics, of analyzing relationships between a set of documents and the terms which the set of documents and the terms contain by producing a set of concepts related to the documents and terms. The latent semantic analysis may recognize that words with close meaning may occur in similar pieces of text. A matrix containing word counts per document (e.g., rows may represent unique words and columns may represent each document) may be constructed from a large piece of text. A mathematical technique called singular value decomposition (SVD) may be used to reduce the number of rows while preserving the similarity structure among columns. Documents may be compared by taking the cosine of the angle between the two vectors (or the dot product between the normalizations of the two vectors) formed by any two columns. In an example, values close to 1 represent very similar documents while values close to 0 represent very dissimilar documents. Similarity score may be the distance between two vectors, the closer the value is to 1, the more similar the two vectors are; the closer the value is to 0, the less similar the two vectors are.

In one or more embodiments, database content evaluation module 124 is configured to evaluate non-natural language description portion of a problem description from database 104. In an example, database content evaluation module 124 may evaluate database-know-who content from the problem description from database 104. Database content evaluation module 124 may leverage database corresponding features including accessing path, semantics, parsing trees and synonym content to aggregate and may determine the similarity to each other. Database content evaluation module 124 may include a normalization process for the database correlation content. For example, database content evaluation module 124 may identify different structure parts and separate the structure parts into different portions for analysis. Database content evaluation module 124 may perform synonym normalization. Database content evaluation module 124 may perform a SQL access path comparison. Database content evaluation module 124 may semantically perform a BNF transfer. Database content evaluation module 124 may construct parse trees from lexical and syntax analysis. Database content evaluation module 124 may identify objects and constant values from an access path. Database content evaluation module 124 may identify columns and data types in database 104. Database content evaluation module 124 may perform comparison and similarity score. Examples are illustrated in FIGS. 5-11.

Figure 12:
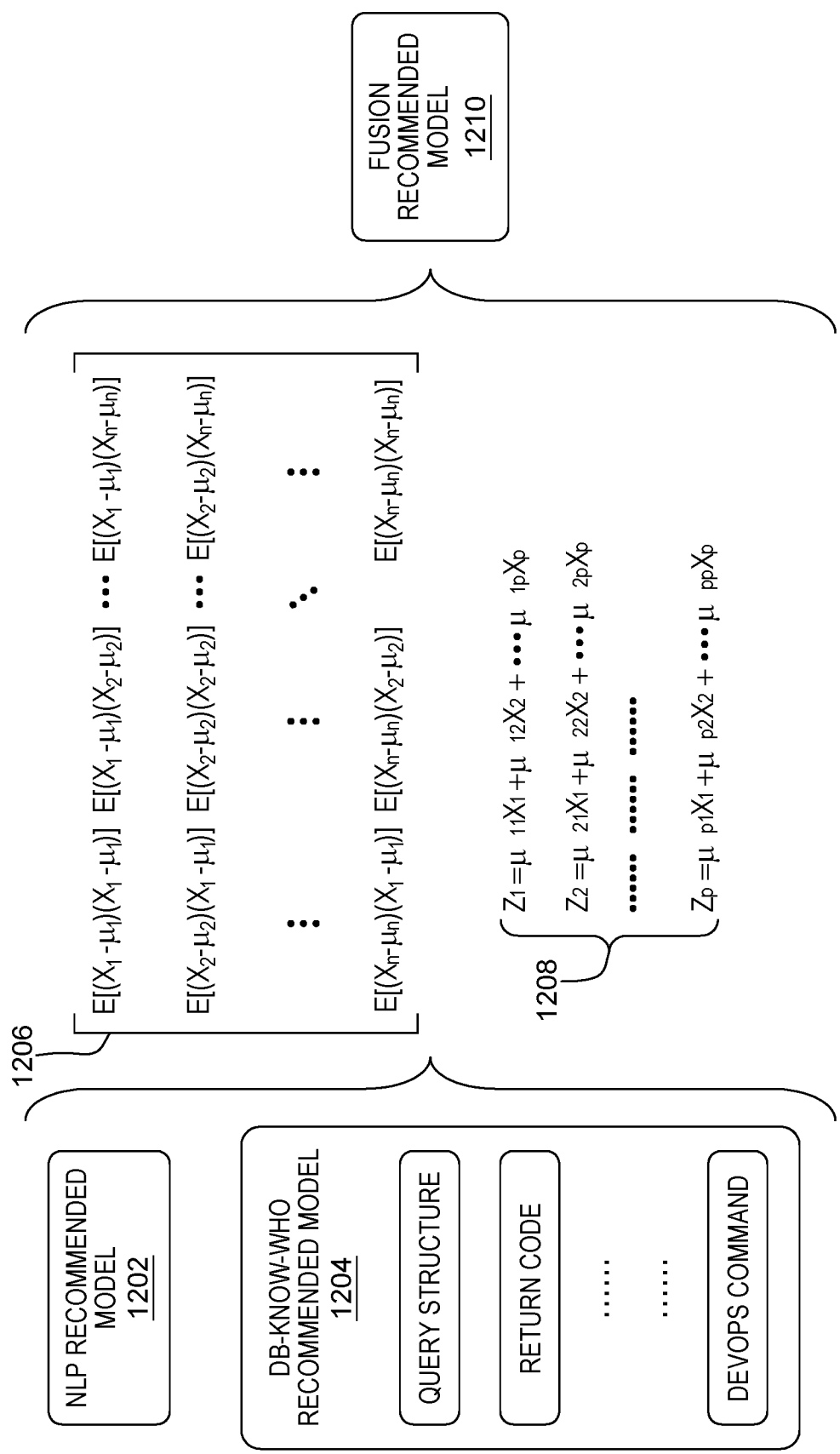
FIG. 12 illustrates an exemplary functional flow of a fusion module in the database self-diagnosis and self-healing module within the computing device of FIG. 1, in accordance with one or more embodiments of the present disclosure.

In one or more embodiments, fusion module 126 is configured to combine different dimensional results of NLP module 122 and database content evaluation module 124. FIG. 12 illustrates a combination of dimensional results of NLP module 122 and database content evaluation module 124 through fusion module 126.

In one or more embodiments, solution matching module 112 is configured to analyze a corresponding resource and operation related to an exception from database 104. Solution matching module 112 may create a two-dimensional model and may import the model to diagnostic base module 110. Solution matching module 112 may use an optimal query and matching algorithm to match the cause of the problem and a solution. If the matching cause and solution are located, solution matching module 112 generates a diagnostic solution and exports it to diagnostic presentation module 114. If no matching cause or solution is located, solution matching module 112 may send the problem to a matching problem owner. After completing troubleshooting, the matching problem owner may submit a diagnostic feedback to diagnostic presentation module 112 through user feedback module 116.

In one or more embodiments, diagnostic presentation module 114 is configured to display a diagnostic status and diagnostic solution. In an example, a user may log on and navigate to diagnostic presentation module 114 to view the current diagnostic status about diagnostic requests submitted in the past certain period, for example, within 30 days or other time period. If a problem has been diagnosed, the user may check the diagnostic solution to obtain the cause of the problem and the corresponding troubleshooting solution. Diagnostic presentation module 114 may display the diagnostic path mining from a recommended model. Diagnostic presentation module 114 may display diagnostic data in real time, including a diagnostic rate, a satisfaction rate, and diagnostic time. Diagnostic presentation module 114 may reflect the coverage and accuracy of diagnostic templates 128 in a timely manner and may promote addition of new templates and optimization of the existing templates.

In one or more embodiments, user feedback module 116 is configured to receive a feedback on diagnostic solutions from a user. User feedback module 116 may help optimize and improve diagnostic base module 110.

Figure 2:
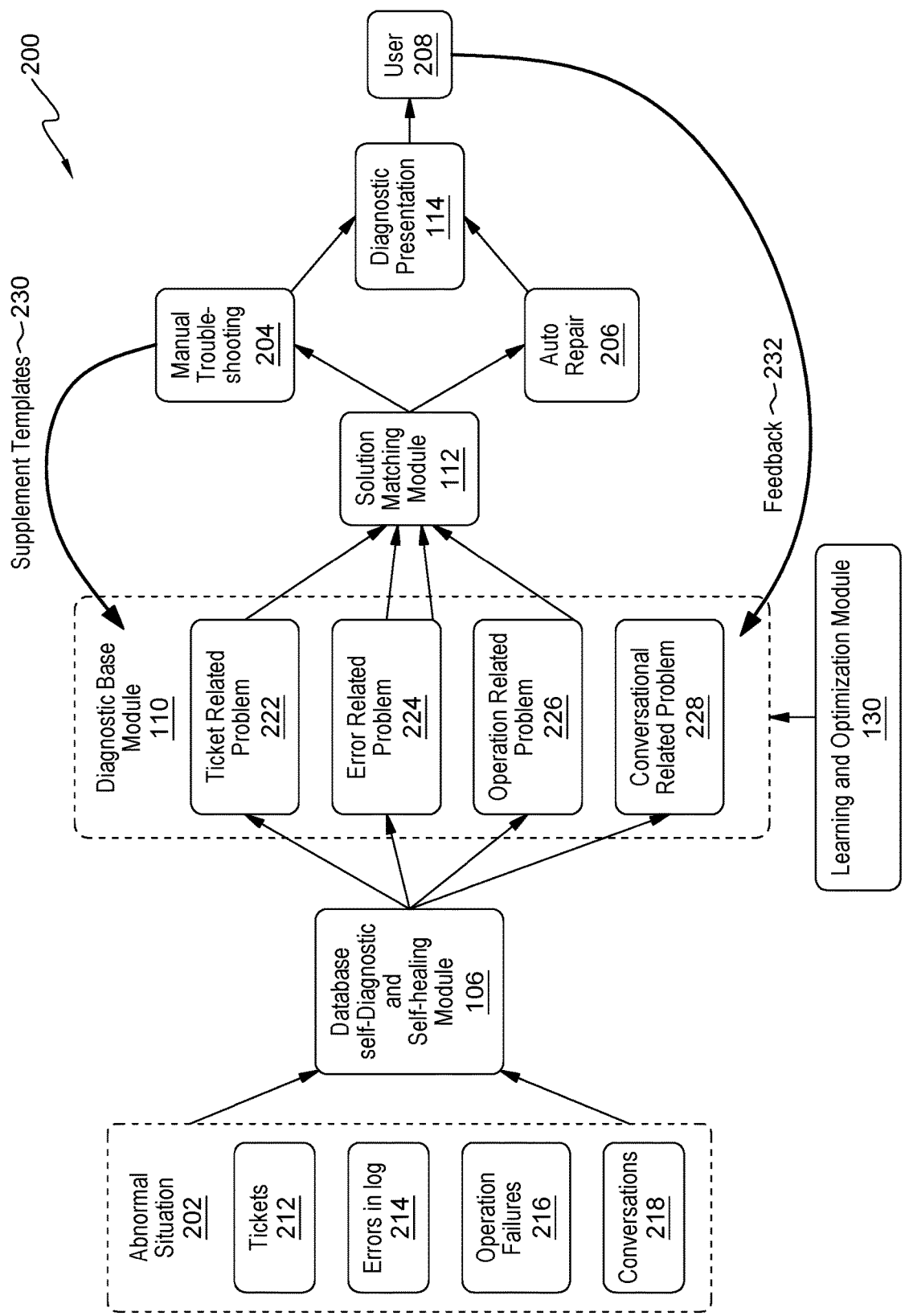
FIG. 2 is an example flowchart depicting operational steps of a database self-diagnosis and self-healing module within a computing device of FIG. 1, in accordance with an embodiment of the present disclosure.

FIG. 2 is an example flowchart 200 depicting operational steps of database self-diagnosis and self-healing module 106 within database self-diagnosis and self-healing environment 100, in accordance with an embodiment of the present disclosure.

Abnormal situation 202, e.g., an operation exception, in database 104 may be an exception from database 104 described in tickets 212, errors in log 214, operation failures 216, conversations 218, and other suitable ways. Database self-diagnosis and self-healing module 106 may receive problem description regarding to abnormal situation 202 from database 104. Diagnostic base module 110 may identify and classify the problem description into different categories, for example, ticket related problems 222, error related problems 224, operation related problems 226, and conversational related problems 228. Learning and optimization module 130 may train and model diagnostic templates 128 and increase accuracy in matching a solution in solution matching module 112 to resolve problems from database 104. Solution matching module 112 may find a solution match for a problem from database 104. In an example, solution matching module 112 may automatically repair 206 a problem from database 104. In another example, solution matching module 112 may perform a manual troubleshooting 204 and provide supplement templates 230 to diagnostic base module 110 to solve a problem. After receiving a user exception distributed by diagnostic base module 110, solution matching module 112 may analyze the corresponding cloud resource type and operation type related to the exception. Solution matching module 112 may analyze a corresponding resource and operation related to an exception from database 104. Solution matching module 112 may create a two-dimensional model and import the model to diagnostic base module 110. Solution matching module 112 may use an optimal query and matching algorithm to match the cause of the problem and a solution. If the matching cause and solution are located, solution matching module 112 generates a diagnostic solution and exports it to diagnostic presentation module 114. If no matching cause or solution is located, solution matching module 112 may send the problem to a matching problem owner, e.g., user 208. After completing troubleshooting, user 208 may submit diagnostic feedback 232 to diagnostic presentation module 112 through user feedback module 116.

Diagnostic presentation module 114 may display a diagnostic status and diagnostic solution. In an example, user 208 may log on and navigate to diagnostic presentation module 114 to view the current diagnostic status about diagnostic requests submitted in the past certain period, for example, within 30 days or other time period. If a problem has been diagnosed, user 208 may check the diagnostic solution to obtain the cause of the problem and the corresponding troubleshooting solution. Diagnostic presentation module 114 may display the diagnostic path mining from a recommended model. User 208 may provide feedback 232 on diagnostic solutions to diagnostic base module 110. Feedbacks from user 208 may help optimize and improve diagnostic base module 110.

Figure 3:
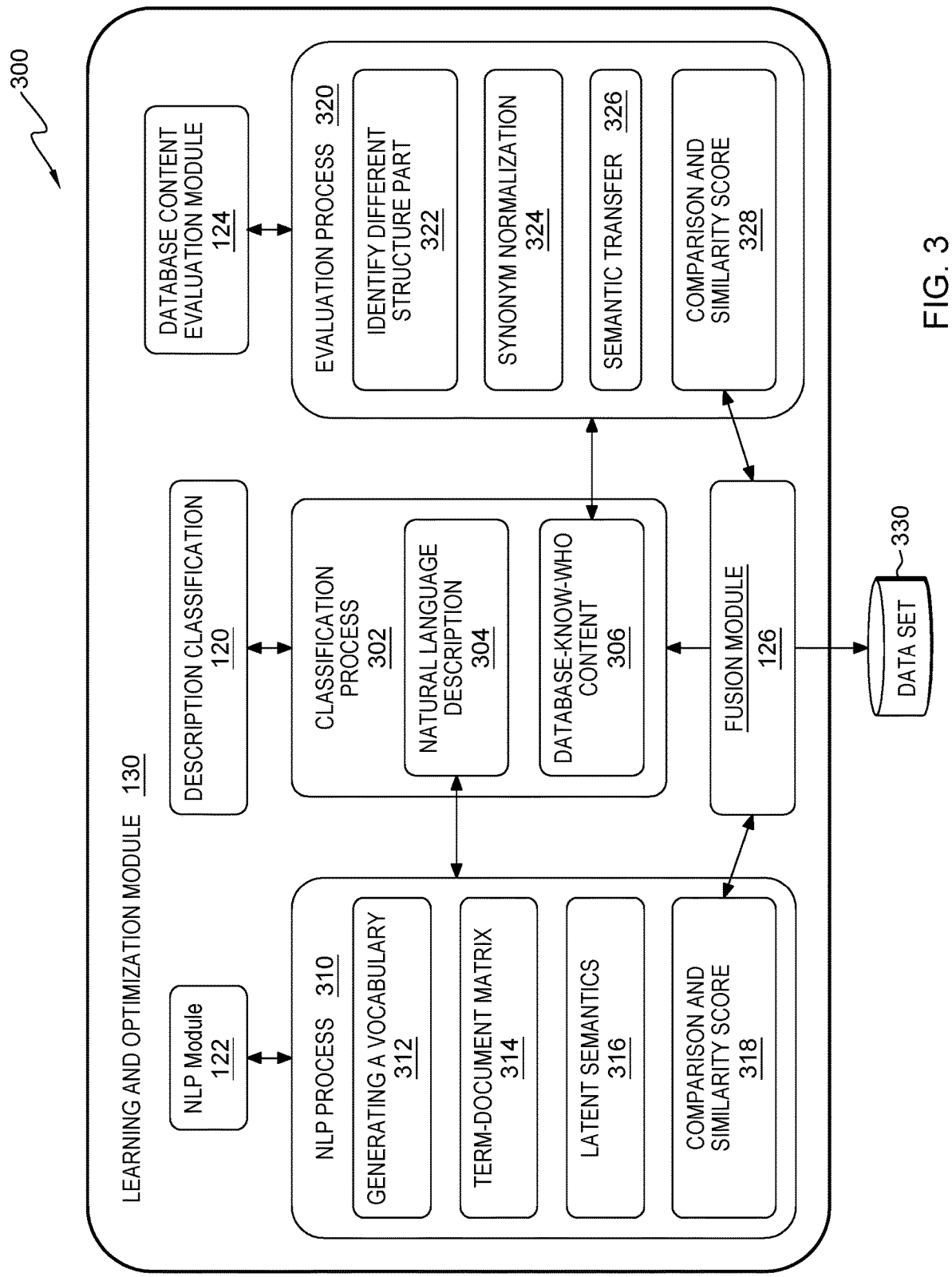
FIG. 3 is an example diagram depicting operational steps of a learning and optimization module within the computing device of FIG. 1, in accordance with an embodiment of the present disclosure.

FIG. 3 is an example diagram 300 depicting operational steps of learning and optimization module 130 within database self-diagnosis and self-healing environment 100, in accordance with an embodiment of the present disclosure.

In the example of FIG. 3, learning and optimization module 130 includes description classification 120, NLP module 122, database content evaluation module 124, and fusion module 126. Description classification 120 may perform classification process 302. Classification process 302 may split problem description into natural language description 304 and database-know-who content 306. In an example, database-know-who content 306 can be a structure content for a database language, e.g., SQL. For example, SQL may allow a user to access and manipulate databases 104. Database-know-who content 306 can include other suitable database languages. Natural language description 304 may be as an input to NLP module 122. Database-know-who content 306 may be as an input to database content evaluation module 124.

NLP module 122 may perform NLP process 310. NLP process 310 includes generating a vocabulary 312 by processing texts in natural language description 304. NLP module 122 may generate term-document matrix 314 based on the occurrence frequency of each term (e.g., word) in each document. In an example, term-document matrix 314 may be divided into a form of multiple matrices. NLP module 122 may use latent semantics 316 analysis technique in natural language processing, in particular distributional semantics, of analyzing relationships between a set of documents and the terms which the set of documents and the terms contain by producing a set of concepts related to the documents and terms. Latent semantics 316 may recognize that words close in meaning may occur in similar pieces of text. A matrix containing word counts per document (e.g., rows may represent unique words and columns may represent each document) may be constructed from a large piece of text. SVD may be used to reduce the number of rows while preserving the similarity structure among columns. Documents may be compared by taking the cosine of the angle between the two vectors (or the dot product between the normalizations of the two vectors) formed by two columns. In an example, values close to 1 may represent very similar documents while values close to 0 may represent very dissimilar documents. Similarity score may be the distance between two vectors, the closer the value is to 1, the more similar the two vectors are; the closer the value is to 0, the less similar the two vectors are. NLP module 122 may perform comparison 318 based on a similarity score between the two vectors.

Database content evaluation module 124 may perform evaluation process 320. Database content evaluation module 124 may evaluate database-know-who content 306 from the problem description from database 104. Database content evaluation module 124 may leverage database corresponding features including accessing path, semantics, parsing trees and synonym content to aggregate and may determine the similarity to each other. Database content evaluation module 124 may include a normalization process for the database correlation content. For example, evaluation process 320 may include identifying a structure part 322 and separating the structure part into different portions for analysis. Database content evaluation module 124 may perform synonym normalization 324. Database content evaluation module 124 may perform SQL access path comparison. Database content evaluation module 124 may perform a semantic transfer 326, e.g., a BNF transfer. Database content evaluation module 124 may construct parse trees from lexical and syntax analysis. Database content evaluation module 124 may identify objects and constant values from an access path. Database content evaluation module 124 may identify columns and data types in database 104. Database content evaluation module 124 may perform comparison and similarity score 328.

Fusion module 126 may combine different dimensional results of NLP module 122 and database content evaluation module 124. Fusion module 126 may output a combination of dimensional results of NLP module 122 and database content evaluation module 124 to dataset 330, for example, diagnostic templates 128.

Figure 4:
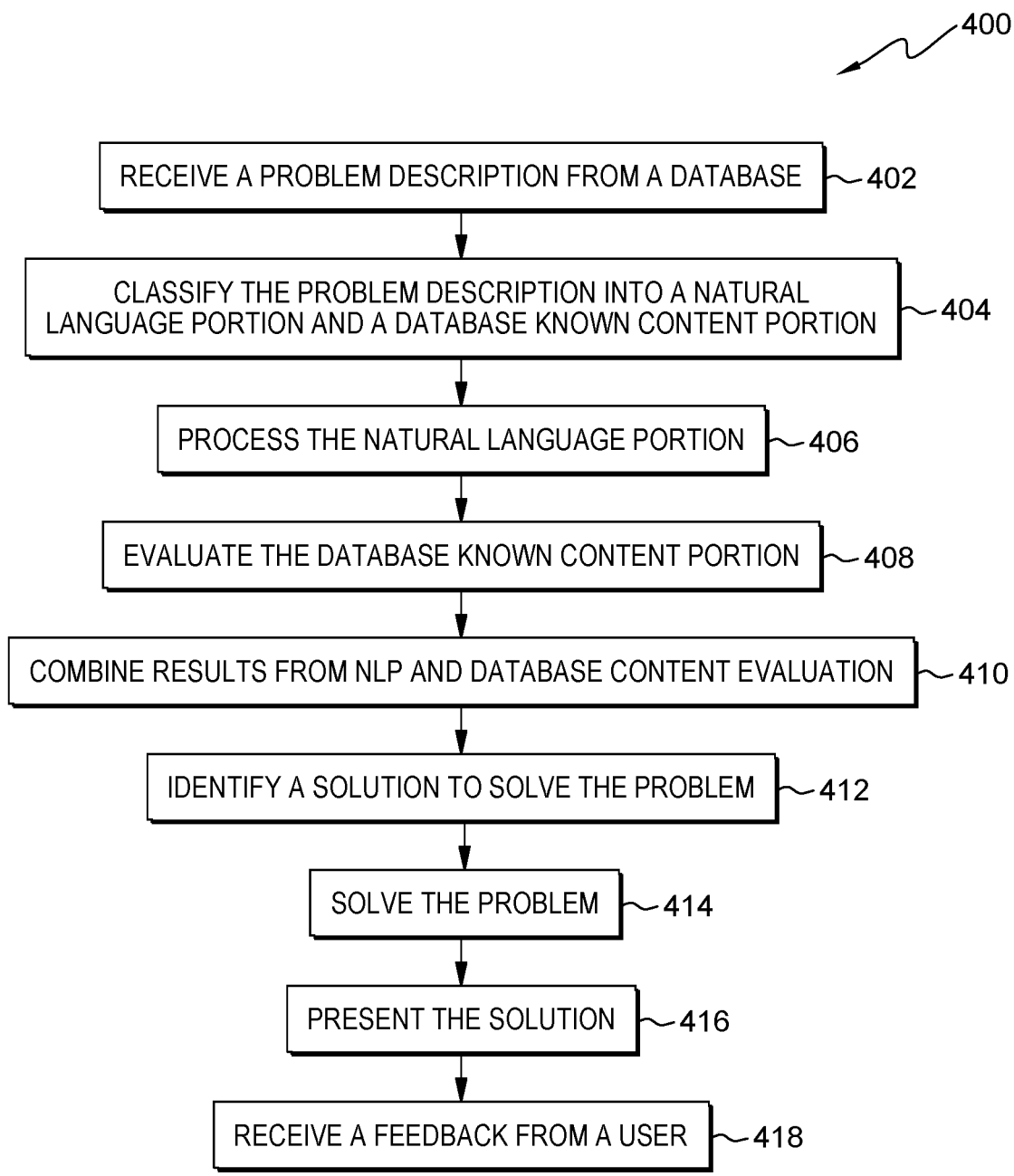
FIG. 4 is a flowchart depicting operational steps of the database self-diagnosis and self-healing module within the computing device of FIG. 1, in accordance with an embodiment of the present disclosure.

FIG. 4 is a flowchart 400 depicting operational steps of database self-diagnosis and self-healing module 106 in accordance with an embodiment of the present disclosure.

Database self-diagnosis and self-healing module 106 operates to receive a problem description generated from database 104. Database self-diagnosis and self-healing module 106 operates to classify the problem description into a natural language description portion and a database-know-who content portion. Database self-diagnosis and self-healing module 106 operates to process the natural language description portion using natural language processing techniques. Database self-diagnosis and self-healing module 106 operates to evaluate the database-know-who content portion. Database self-diagnosis and self-healing module 106 operates to combine results of processing natural language description portion and evaluating the database-know-who content portion. Database self-diagnosis and self-healing module 106 operates to identify a solution based on the problem description and the results of processing natural language description portion and evaluating the database-know-who content portion. Database self-diagnosis and self-healing module 106 operates to solve the problem using the solution identified. Database self-diagnosis and self-healing module 106 operates to present the identified solution. Database self-diagnosis and self-healing module 106 operates to receive a feedback from a user based on the presented solution.

In step 402, database self-diagnosis and self-healing module 106 receives a problem description generated from database 104. Database self-diagnosis and self-healing module 106 may receive the problem description of abnormal situations from database 104. For example, the abnormal situations may include tickets related problems, error related problems, operation related problems, conversational related problems, and other problems reported from database 104.

In step 404, database self-diagnosis and self-healing module 106 classifies the problem description into a natural language description portion and a database-know-who content portion. In an example, database self-diagnosis and self-healing module 106 may split the problem description into the natural language description portion and the database-know-who content portion using description classification 120. Description classification 120 may get corresponding database structures and level a BNF tree to split problem description into a natural language processing part and a database-know-who part. In general, BNF is a notation technique for context-free grammars, often used to describe the syntax of languages used in computing, such as computer programming languages, document formats, instruction sets and communication protocols. BNF may be applied wherever exact descriptions of languages are needed: for instance, in official language specifications, in manuals, and in textbooks on programming language theory. In an example, the problem description may include both natural language description portion and database-know-who content portion. In another example, the problem description may include only natural language description portion. In yet another example, the description data may include database-know-who content portion only. The database-know-who content portion can be constructed in a database content language. For example, the database-know-who content portion can be a structure content for a database language, e.g., structured query language (SQL). In an example, SQL may allow a user to access and manipulate databases 104. The database-know-who content portion can include other suitable database languages. The natural language description portion may be as an input to NLP module 122. The database-know-who content portion may be as an input to database content evaluation module 124. In one or more embodiments, description classification 120 may include a database dictionary. The database dictionary can include natural language words. The database dictionary can also include database relative terms and contents. The database dictionary can be generated by incorporating, for example, a NLTK. A NLTK can be a suite of libraries and programs for symbolic and statistical natural language processing in a programming language, e.g., Python programming language, or other programming languages. The database dictionary can be generated by incorporating database relative terms crawled from a database knowledge center.

In step 406, database self-diagnosis and self-healing module 106 processes the natural language description portion using natural language processing techniques through NLP module 122. In one or more embodiments, NLP module 122 may process the natural language description portion classified from description classification 120. NLP module 122 may generate a vocabulary by processing texts in the natural language description portion. NLP module 122 may generate a term-document matrix based on the occurrence frequency of each term (e.g., word) in each document. In an example, the term-document matrix may be divided into a form of multiple matrices. NLP module 122 may use a latent semantic analysis technique in natural language processing, in particular distributional semantics, of analyzing relationships between a set of documents and the terms which the set of documents and the terms contain by producing a set of concepts related to the documents and terms. NLP module 122 may recognize that words close in meaning may occur in similar pieces of text. A matrix containing word counts per document (e.g., rows may represent unique words and columns may represent each document) may be constructed from a large piece of text. A mathematical technique called SVD may be used to reduce the number of rows while preserving the similarity structure among columns. Documents may be compared by taking the cosine of the angle between the two vectors (or the dot product between the normalizations of the two vectors) formed by any two columns. In an example, values close to 1 represent very similar documents while values close to 0 represent very dissimilar documents. Similarity score may be the distance between two vectors, the closer the value is to 1, the more similar the two vectors are; the closer the value is to 0, the less similar the two vectors are.

In step 408, database self-diagnosis and self-healing module 106 evaluates the database-know-who content portion through database content evaluation module 124. In one or more embodiments, database content evaluation module 124 may evaluate the database-know-who content portion of a problem description from database 104. In an example, database content evaluation module 124 may evaluate the database-know-who content from the problem description from database 104. Database content evaluation module 124 may leverage database corresponding features including accessing path, semantics, parsing trees and synonym content to aggregate and may determine the similarity to each other. Database content evaluation module 124 may include a normalization process for the database correlation content. For example, database content evaluation module 124 may identify different structure parts and separate the structure parts into different portions for analysis. Database content evaluation module 124 may perform synonym normalization. Database content evaluation module 124 may perform SQL access path comparison. Database content evaluation module 124 may semantically perform a BNF transfer. Database content evaluation module 124 may construct parse trees from lexical and syntax analysis. Database content evaluation module 124 may identify objects and constant values from an access path. Database content evaluation module 124 may identify columns and data types in database 104. Database content evaluation module 124 may perform comparison and similarity score.

In step 410, database self-diagnosis and self-healing module 106 combines results of processing the natural language description portion and evaluating the database-know-who content portion through fusion module 126. In one or more embodiments, fusion module 126 may combine different dimensional results of NLP module 122 and database content evaluation module 124. Fusion module 126 may provide a recommended model based on the combined results of NLP module 122 and database content evaluation module 124.

In step 412, database self-diagnosis and self-healing module 106 identifies a solution based on the problem description and the results of processing natural language description portion and evaluating the database-know-who content portion. Database self-diagnosis and self-healing module 106 may provide the solution based on the problem description and the results of processing natural language description portion and evaluating the database-know-who content portion. In one or more embodiments, solution matching module 112 may analyze a corresponding resource and operation related to an exception from database 104. Solution matching module 112 may create a two-dimensional model and import the model to diagnostic base module 110. Solution matching module 112 may use an optimal query and matching algorithm to match the cause of the problem and a solution. If the matching cause and solution are located, solution matching module 112 generates a diagnostic solution and exports it to diagnostic presentation module 114. If no matching cause or solution is located, solution matching module 112 may send the problem to a matching problem owner. After completing troubleshooting, the matching problem owner may submit a diagnostic feedback to diagnostic presentation module 112 through user feedback module 116.

In step 414, database self-diagnosis and self-healing module 106 solves the problem using the solution identified through solution matching module 112. In an example, solution matching module 112 may automatically repair the problem from database 104. In another example, solution matching module 112 may perform a manual troubleshooting and provide supplement templates to diagnostic base module 110.

In step 416, database self-diagnosis and self-healing module 106 presents the solution identified. In one or more embodiments, diagnostic presentation module 114 may display a diagnostic status and diagnostic solution. In an example, a user may log on and navigate to diagnostic presentation module 114 to view the current diagnostic status about diagnostic requests submitted in the past certain period, for example, within 30 days or other time period. If a problem has been diagnosed, the user may check the diagnostic solution to obtain the cause of the problem and the corresponding troubleshooting solution. Diagnostic presentation module 114 may display the diagnostic path mining from a recommended model.

In step 418, database self-diagnosis and self-healing module 106 receives feedback from a user based on the presented solution. In one or more embodiments, user feedback module 116 may receive feedback on diagnostic solutions from a user. User feedback module 116 may optimize and improve outputs from diagnostic base module 110.

Figure 5:
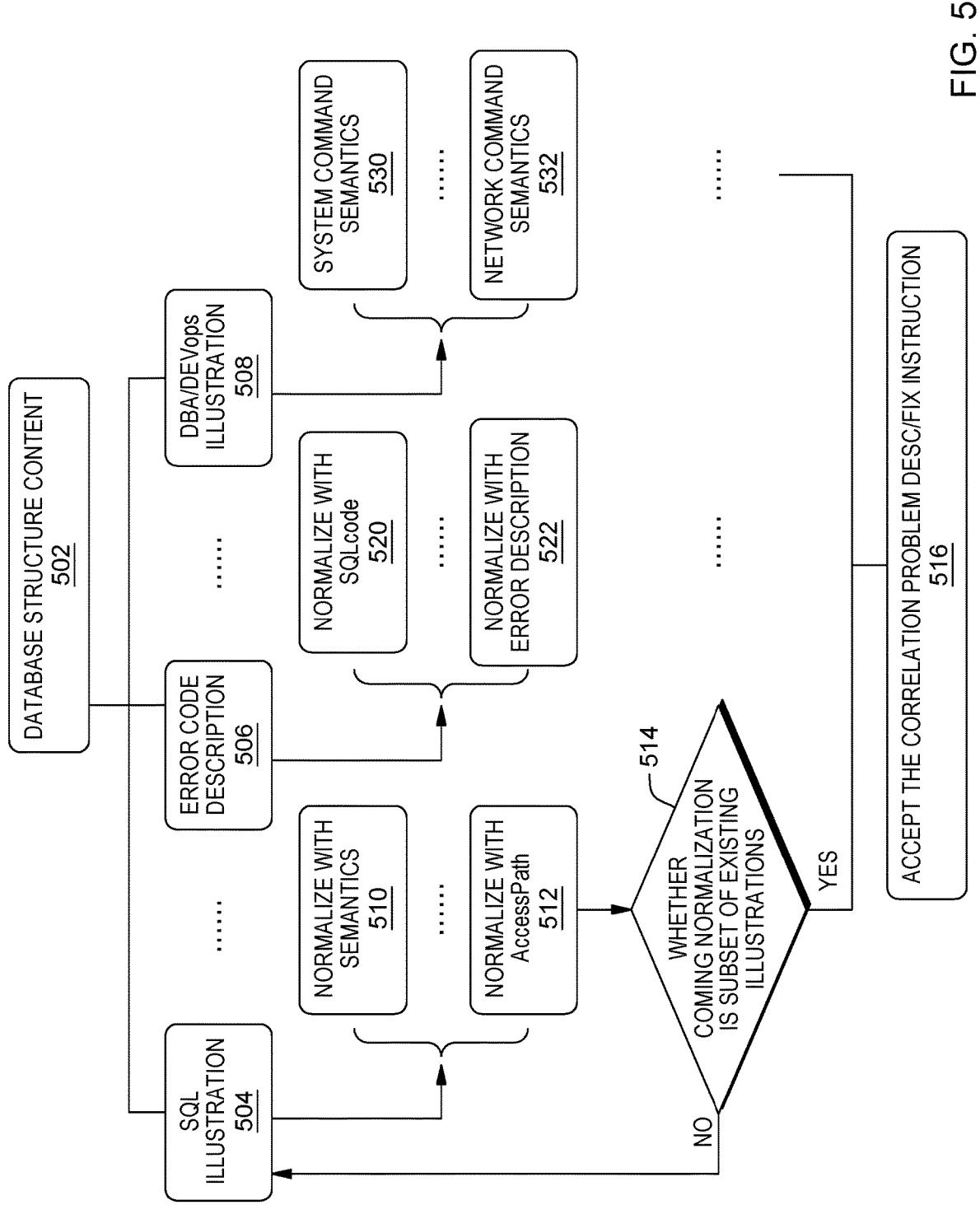
FIG. 5 illustrates an exemplary functional flow of a database content evaluation module in the database self-diagnosis and self-healing module within the computing device of FIG. 1, in accordance with one or more embodiments of the present disclosure.

FIG. 5 illustrates an exemplary functional flow of database content evaluation module 124 in database self-diagnosis and self-healing module 106 in accordance with one or more embodiments of the present disclosure.

In the example of FIG. 5, database content evaluation module 124 may identify and split database content structure 502 into multiple parts, e.g., SQL illustration 504, error code description 506, database administration/development operations illustration 508. For the part of SQL illustration 504, database content evaluation module 124 may normalize with semantics 510. Database content evaluation module 124 may normalize with access path 512. In block 514, database content evaluation module 124 may determine whether coming normalization is a subset of existing illustrations. If database content evaluation module 124 determines that coming normalization is a subset of existing illustrations, database content evaluation module 124 may accept the correlation problem description instruction 516. For the part of error code description 506, database content evaluation module 124 may normalize with SQL code 520. Database content evaluation module 124 may normalize with error description 522. For the part of database administration/development operations illustration 508, database content evaluation module 124 may illustrate with system command semantics 530. Database content evaluation module 124 may illustrate with network command semantics 532.

Figure 6:
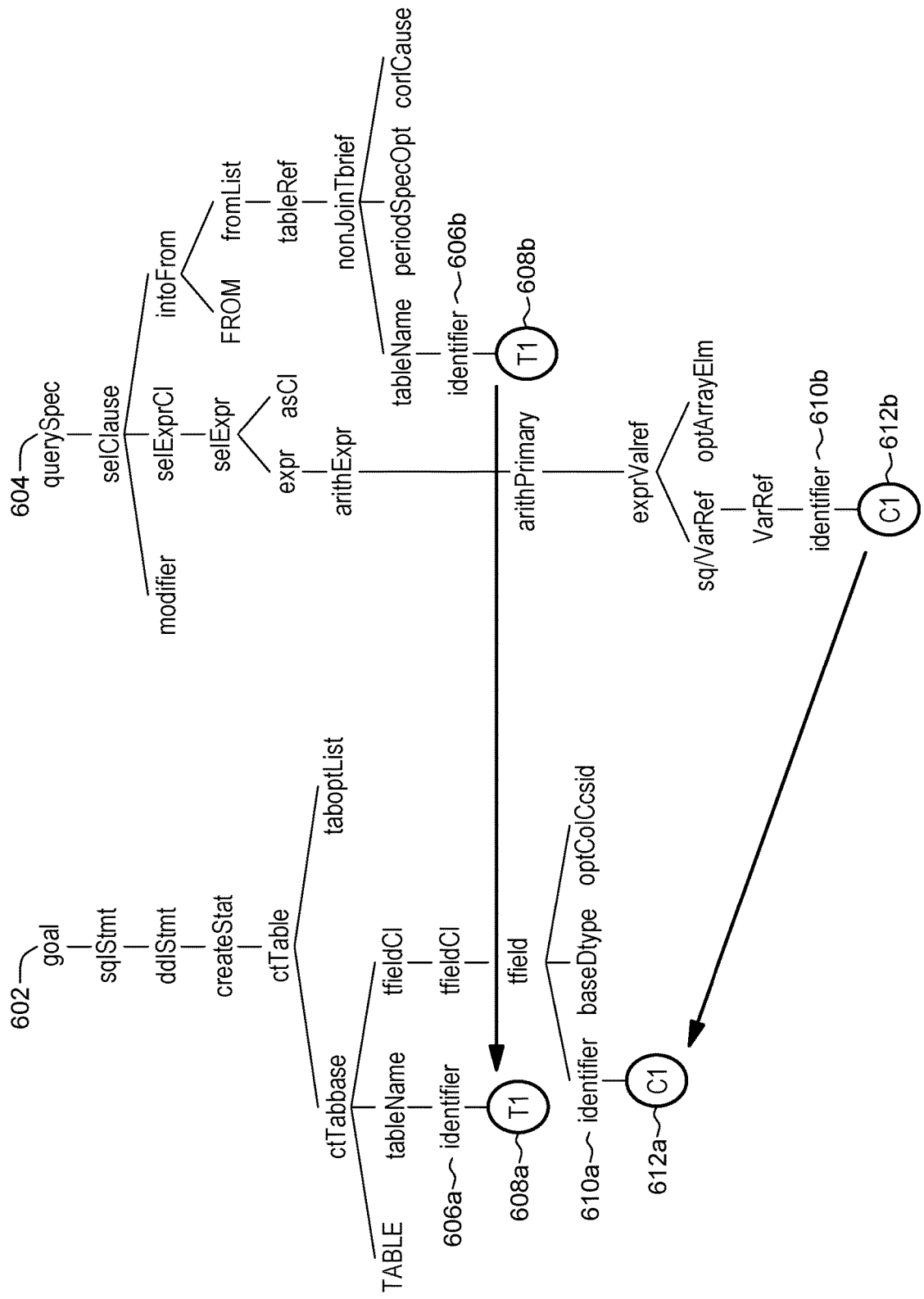
FIG. 6 is an example illustrating a synonym normalization of the database content evaluation module in the database self-diagnosis and self-healing module within the computing device of FIG. 1, in accordance with one or more embodiments of the present disclosure.

FIG. 6 illustrates an example of synonym normalization with database content evaluation module 124 in database self-diagnosis and self-healing module 106 in accordance with one or more embodiments of the present disclosure.

In the example of FIG. 6, database content "goal" 602 includes a path having identifier 606*a* and a corresponding value of identifier 608*a*. Database content "querySpec" 604 includes a path having identifier 606*b* and a corresponding value of identifier 608*b*. Database content evaluation module 124 may normalize the corresponding values of identifier 608*a* and 608*b* as a same value as, e.g., "T1". Database content goal 602 also includes a path having identifier 610*a* and a corresponding value of identifier 612*a*. Database content querySpec 604 also includes a path having identifier 610*b* and a corresponding value of identifier 612*b*. Database content evaluation module 124 may normalize the corresponding values of identifier 610*a* and 610*b* as a same value as, e.g., "C1".

FIG. 7 is an example of illustrating name normalization of database content evaluation module 124 in database self-diagnosis and self-healing module 106 in accordance with one or more embodiments of the present disclosure. In the example of FIG. 7, database content evaluation module 124 normalize object names, for example, from table_parent 702*a* to tab #1 702*b*, from table_child 704*a* to tab #2 704*b*.

Figure 8:
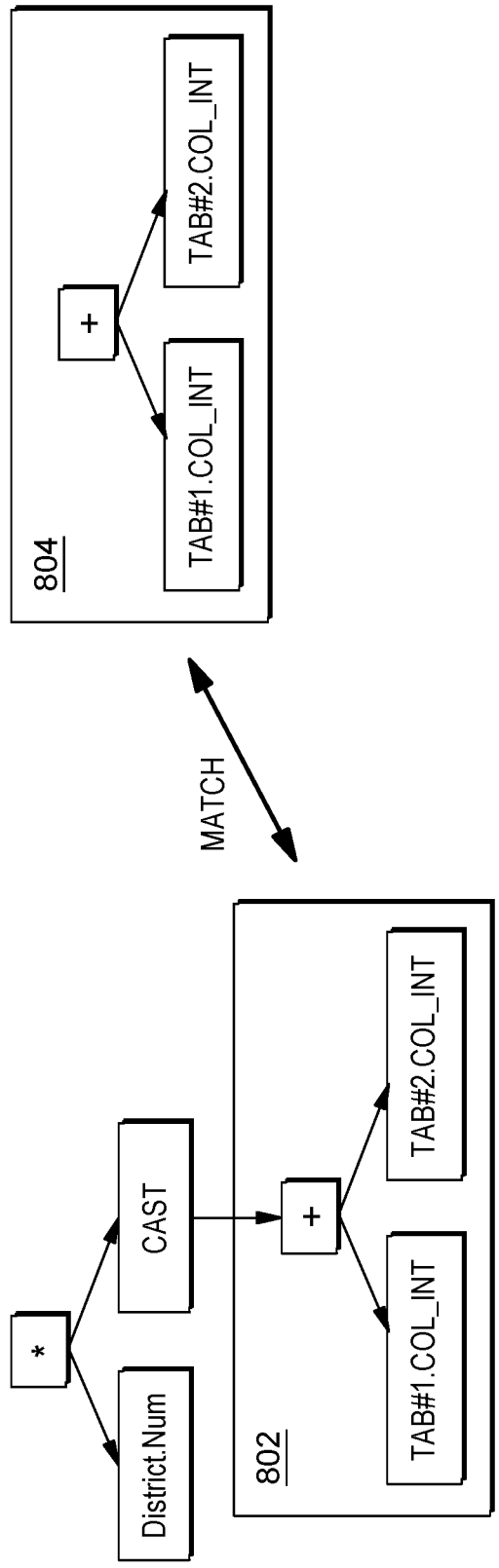
FIG. 8 is an example illustrating a semantic comparison of the database content evaluation module in the database self-diagnosis and self-healing module within the computing device of FIG. 1, in accordance with one or more embodiments of the present disclosure.

FIG. 8 is an example of illustrating SQL semantic comparison of database content evaluation module 124 in database self-diagnosis and self-healing module 106 in accordance with one or more embodiments of the present disclosure. In the example of FIG. 8, database content evaluation module 124 may match block 802 in SQL expression under database 104 to block 804 in SQL expression from a patch illustration.

FIG. 9 is an example of illustrating predicate tree matching of database content evaluation module 124 in database self-diagnosis and self-healing module 106 in accordance with one or more embodiments of the present disclosure. In the example of FIG. 9, database content evaluation module 124 may match block 902 in predicate of SQL running under database 104 to block 904 in predicate of SQL from a patch illustration.

FIG. 10 is example of illustrating SQL access path comparison of database content evaluation module 124 in database self-diagnosis and self-healing module 106 in accordance with one or more embodiments of the present disclosure. In the example of FIG. 10, database content evaluation module 124 may match block 1002 to block 1004 after normalizing object names in block 1002. Database content evaluation module 124 may match block 1006 to block 1008 after normalizing object names in block 1006. Database content evaluation module 124 may match block 1010 to block 1012 after normalizing object names in block 1010. Database content evaluation module 124 may match block 1014 to block 1016 after normalizing object names in block 1014.

FIG. 11 is example of illustrating SQL access path comparison of database content evaluation module 124 in database self-diagnosis and self-healing module 106 in accordance with one or more embodiments of the present disclosure. In the example of FIG. 11, database content evaluation module 124 may match block 1102 to block 1104 with a subset relationship.

FIG. 12 illustrates an exemplary functional flow of fusion module 126 in database self-diagnosis and self-healing module 106 in accordance with one or more embodiments of the present disclosure. Fusion module 126 may combine different dimensional results of NLP module 122 and database content evaluation module 124. Fusion module 126 may output a combination of dimensional results of NLP module 122 and database content evaluation module 124. In the example of FIG. 12, fusion module 126 may combine NLP recommended model 1202 from NLP module 122 and database-know-who recommended model 1204 from database content evaluation module 124. Fusion module 126 may output fusion recommended model 1210 based in the combination of NLP recommended model 1202 and database-know-who recommended model 1204 using example formulas 1206 and 1208.

Figure 13:
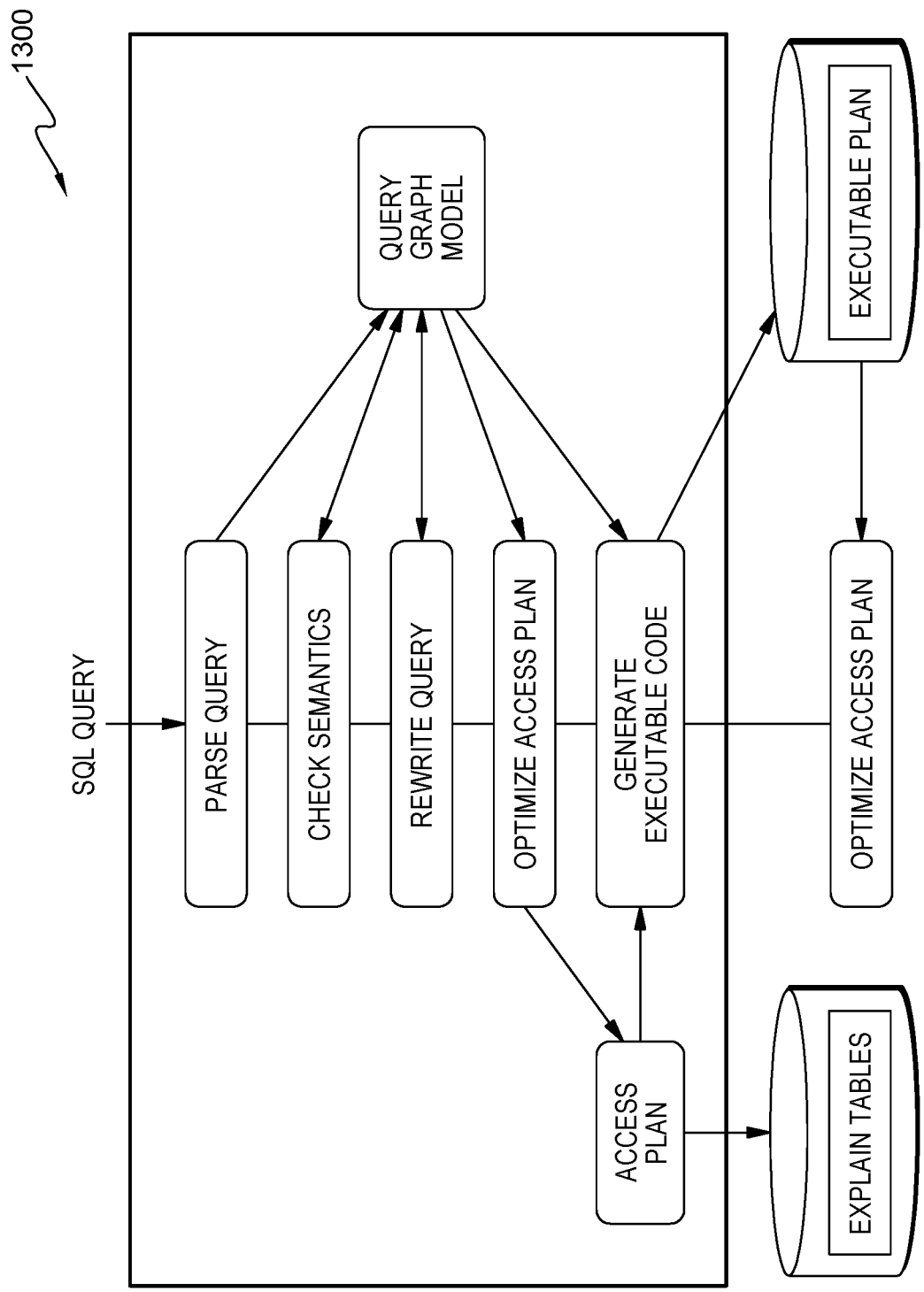
FIG. 13 illustrates an example diagnostic path of the database self-diagnosis and self-healing module within the computing device of FIG. 1, in accordance with one or more embodiments of the present disclosure.

FIG. 13 illustrates an example diagnostic path 1300 of database self-diagnosis and self-healing module 106 in accordance with one or more embodiments of the present disclosure. Database self-diagnosis and self-healing module 106 may locate correlation diagnostic steps of each relevant content and select an optical correction in each part as shown in example diagnostic path 1300. Diagnostic presentation module 114 may display diagnostic path 1300.

Figure 14:
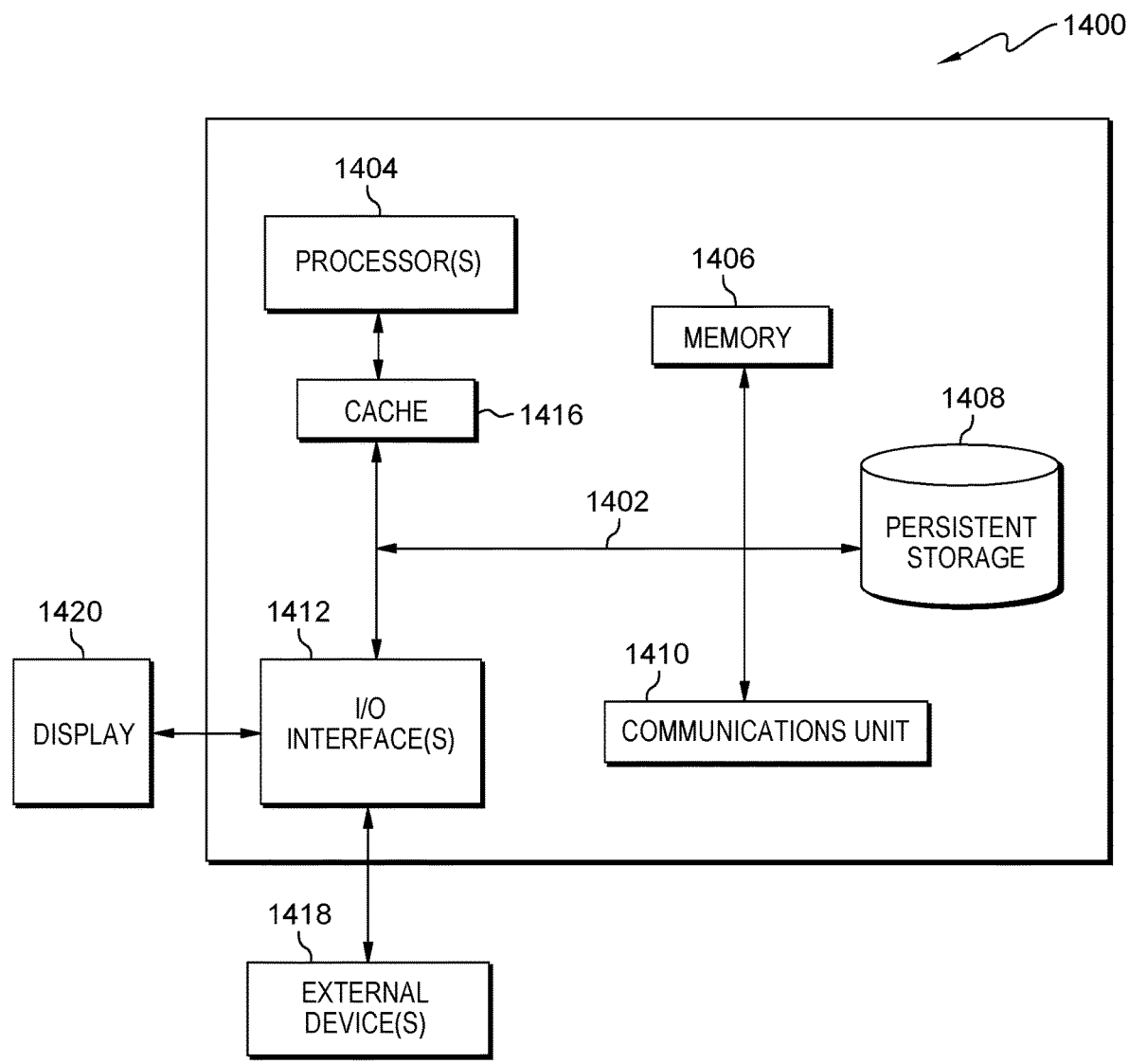
FIG. 14 is a block diagram of components of the computing device of FIG. 1, in accordance with an embodiment of the present disclosure.

FIG. 14 depicts a block diagram 1400 of components of computing device 102 in accordance with an illustrative embodiment of the present disclosure. It should be appreciated that FIG. 14 provides only an illustration of one implementation and does not imply any limitations with regard to the environments in which different embodiments may be implemented. Many modifications to the depicted environment may be made.

Computing device 102 may include communications fabric 1402, which provides communications between cache 1416, memory 1406, persistent storage 1408, communications unit 1410, and input/output (I/O) interface(s) 1412. Communications fabric 1402 can be implemented with any architecture designed for passing data and/or control information between processors (such as microprocessors, communications and network processors, etc.), system memory, peripheral devices, and any other hardware components within a system. For example, communications fabric 1402 can be implemented with one or more buses or a crossbar switch.

Memory 1406 and persistent storage 1408 are computer readable storage media. In this embodiment, memory 1406 includes random access memory (RAM). In general, memory 1406 can include any suitable volatile or non-volatile computer readable storage media. Cache 1416 is a fast memory that enhances the performance of computer processor(s) 1404 by holding recently accessed data, and data near accessed data, from memory 1406.

Database self-diagnosis and self-healing module 106 may be stored in persistent storage 1408 and in memory 1406 for execution by one or more of the respective computer processors 1404 via cache 1416. In an embodiment, persistent storage 1408 includes a magnetic hard disk drive. Alternatively, or in addition to a magnetic hard disk drive, persistent storage 1408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1408 may also be removable. For example, a removable hard drive may be used for persistent storage 1408. Other examples include optical and magnetic disks, thumb drives, and smart cards that are inserted into a drive for transfer onto another computer readable storage medium that is also part of persistent storage 1408.

Communications unit 1410, in these examples, provides for communications with other data processing systems or devices. In these examples, communications unit 1410 includes one or more network interface cards. Communications unit 1410 may provide communications through the use of either or both physical and wireless communications links. Database self-diagnosis and self-healing module 106 may be downloaded to persistent storage 1408 through communications unit 1410.

I/O interface(s) 1412 allows for input and output of data with other devices that may be connected to computing device 102. For example, I/O interface 1412 may provide a connection to external devices 1418 such as a keyboard, keypad, a touch screen, and/or some other suitable input device. External devices 1418 can also include portable computer readable storage media such as, for example, thumb drives, portable optical or magnetic disks, and memory cards. Software and data used to practice embodiments of the present invention, e.g., database self-diagnosis and self-healing module 106 can be stored on such portable computer readable storage media and can be loaded onto persistent storage 1408 via I/O interface(s) 1412. I/O interface(s) 1412 also connect to display 1420.

Display 1420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
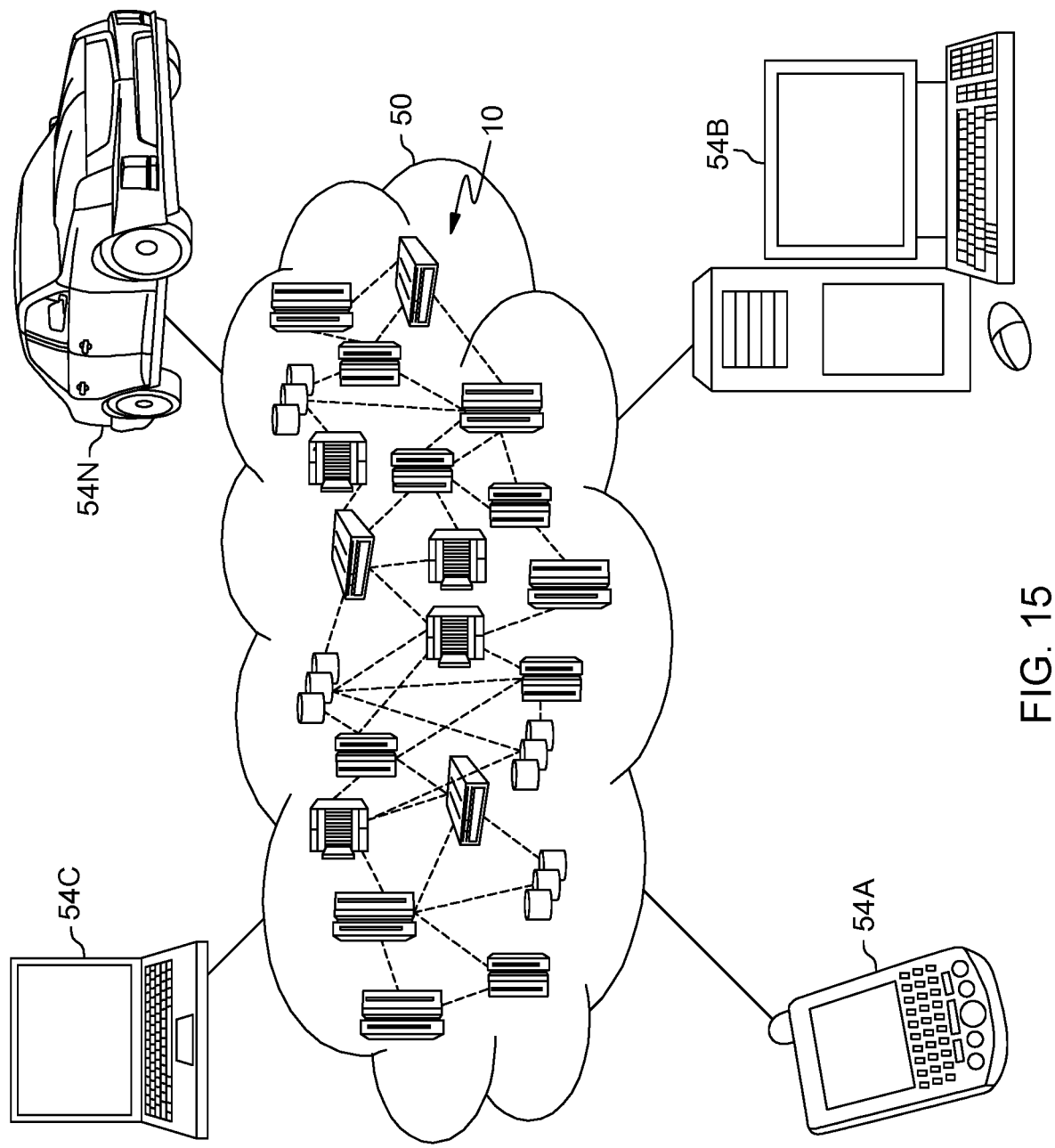
FIG. 15 depicts an embodiment of a cloud computing environment in accordance with the present disclosure.

Referring now to FIG. 15, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 10 and cloud computing environment 50 can communicate with any type of computerized device over any type of network and/or network addressable connection (e.g., using a web browser).

Figure 16:
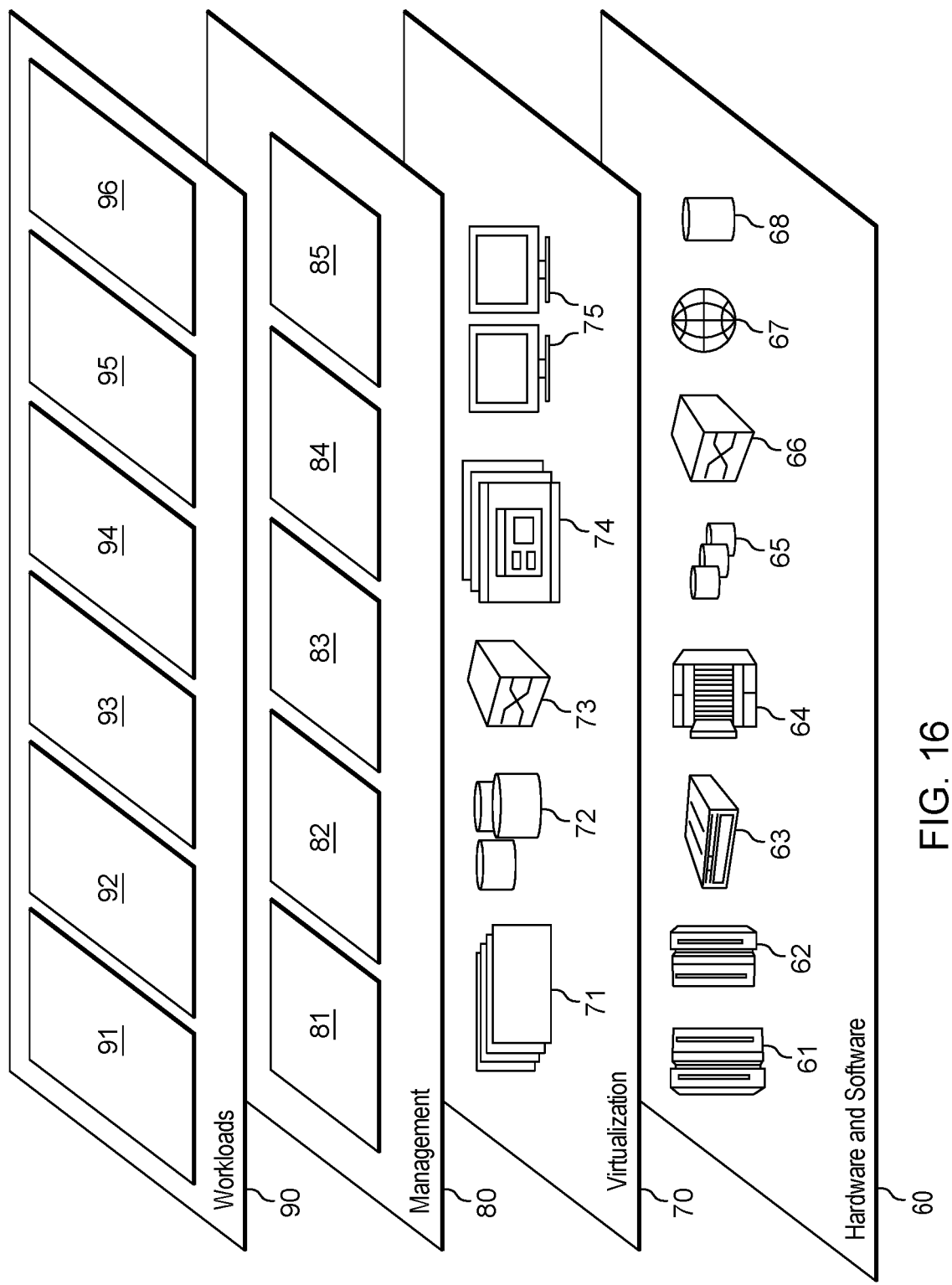
FIG. 16 depicts an embodiment of abstraction model layers of a cloud computing environment, in accordance with the present disclosure.

Referring now to FIG. 16, a set of functional abstraction layers provided by cloud computing environment 50 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, database self-diagnosis and self-healing module 106 as described above with respect to database self-diagnosis and self-healing environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   receiving, by one or more processors, a description of a database problem;
   classifying, by one or more processors, the description of the database problem into a natural language description portion and a database-know-who content portion by utilizing a Backus normal form (BNF) tree to split the description of the database problem into the natural language portion and the database-know-who content portion;
   processing, by one or more processors, the natural language description portion using natural language processing techniques;
   evaluating, by one or more processors, the database-know-who content portion, wherein evaluating the database-know-who content portion comprises:
     a normalization process for database correlation content,
     identifying a database structure,
     separating the database structure into different parts for analysis, and
     identifying objects and constant values from an access path;
   leveraging, by one or more processors, database corresponding features including accessing path, semantics, parsing trees and synonym content to aggregate;
   determining, by one or more processors, the similarity between each of the corresponding features by comparing a similarity score of each respective feature;
   combining, by one or more processors, a result of processing the natural language description portion and evaluating the database-know-who content portion;
   identifying, by one or more processors, a solution based on the description of the database problem and the combined result; and
   automatically repairing, by one or more processors, the database problem using the identified solution.

2. The computer-implemented method of claim 1, further comprising:
   presenting, by one or more processors, the solution to a user; and
   receiving, by one or more processors, diagnostic feedback from the user based on the presented solution.

3. The computer-implemented method of claim 1, wherein the database-know-who content portion is a structure content for a database language.

4. A computer program product comprising:
   one or more computer readable storage media, and program instructions collectively stored on the one or more computer readable storage media, the program instructions comprising:
   program instructions to receive a description of a database problem;
   program instructions to classify the description of the database problem into a natural language description portion and a database-know-who content portion by utilizing a Backus normal form (BNF) tree to split the description of the database problem into the natural language portion and the database-know-who content portion;
   program instructions to process the natural language description portion using natural language processing techniques;
   program instructions to evaluate the database-know-who content portion, wherein program instructions to evaluate the database-know-who content portion comprise:
     a normalization process for database correlation content,
     program instructions to identify a database structure,
     program instructions to separate the database structure into different parts for analysis, and
     program instructions to identify objects and constant values from an access path;
   program instructions to leverage database corresponding features including accessing path, semantics, parsing trees and synonym content to aggregate;
   program instructions to determine the similarity between each of the corresponding features by comparing a similarity score of each respective feature;
   program instructions to combine a result of processing the natural language description portion and evaluating the database-know-who content portion;
   program instructions to identify a solution based on the description of the database problem and the combined result; and
   program instructions to automatically repair the database problem using the identified solution.

5. The computer program product of claim 4, further comprising:
   program instructions, stored on the one or more computer-readable storage media, to present the solution to a user; and
   program instructions, stored on the one or more computer-readable storage media, to receive diagnostic feedback from the user based on the presented solution.

6. The computer program product of claim 4, wherein the database-know-who content portion is a structure content for a database language.

7. A computer system comprising:
   one or more computer processors, one or more computer readable storage media, and program instructions stored on the one or more computer readable storage media for execution by at least one of the one or more computer processors, the program instructions comprising:
   program instructions to receive a description of a database problem;
   program instructions to classify the description of the database problem into a natural language description portion and a database-know-who content portion by utilizing a Backus normal form (BNF) tree to split the description of the database problem into the natural language portion and the database-know-who content portion;

program instructions to process the natural language description portion using natural language processing techniques;

program instructions to evaluate the database-know-who content portion, wherein program instructions to evaluate the database-know-who content portion comprise:

a normalization process for database correlation content, program instructions to identify a database structure, program instructions to separate the database structure into different parts for analysis, and program instructions to identify objects and constant values from an access path;

program instructions to leverage database corresponding features including accessing path, semantics, parsing trees and synonym content to aggregate;

program instructions to determine the similarity between each of the corresponding features by comparing a similarity score of each respective feature;

program instructions to combine a result of processing the natural language description portion and evaluating the database-know-who content portion;

program instructions to identify a solution based on the description of the database problem and the combined result; and program instructions to automatically repair the database problem using the identified solution.

8. The computer system of claim 7, further comprising:

program instructions, stored on the one or more computer-readable storage media, to present the solution to a user; and program instructions, stored on the one or more computer-readable storage media, to receive diagnostic feedback from the user based on the presented solution.

9. The computer system of claim 7, wherein the database-know-who content portion is a structure content for a database language.

\* \* \* \* \*